US005819538A

United States Patent [19]

Lawson, Jr.

[11] Patent Number: 5,819,538

[45] Date of Patent: Oct. 13, 1998

[54] TURBOCHARGED ENGINE SYSTEM WITH RECIRCULATION AND SUPPLEMENTAL AIR SUPPLY

[76] Inventor: Thomas Towles Lawson, Jr., 2815 Catawba Rd., Daleville, Va. 24083

[21] Appl. No.: 751,052

[22] Filed: Nov. 15, 1996

[51] Int. Cl.[6] .................... F02B 37/00

[52] U.S. Cl. .................... 60/611

[58] Field of Search .................... 60/611, 612

[56] References Cited

U.S. PATENT DOCUMENTS 3,190,068 6/1965 Williams et al. .
3,270,730 9/1966 Timoney .
3,279,447 10/1966 Barnett et al. .
3,396,533 8/1968 Fischer .
3,595,013 7/1971 Brille .
3,603,079 9/1971 Kickbusch .
3,673,796 7/1972 Weick et al. .
3,795,231 3/1974 Brille .
3,921,403 11/1975 McInerney et al. .
3,933,137 1/1976 Uno et al. .
4,162,281 7/1979 Ingraham .
4,354,464 10/1982 Fujita .
4,465,050 8/1984 Igashira et al. .
4,481,773 11/1984 Sugito et al. .
4,505,169 3/1985 Ganoung .
4,530,339 7/1985 Oguma et al. .
4,563,997 1/1986 Aoki .
4,612,827 9/1986 Omitsu .
4,689,960 9/1987 Schröder et al. .
4,729,225 3/1988 Bucher .
4,730,593 3/1988 Regar .
4,803,969 2/1989 Hiereth et al. .
4,817,387 4/1989 Lashbrook .
4,875,454 10/1989 Okimoto et al. .
4,907,549 3/1990 Morikawa et al. .
4,998,951 3/1991 Kawamura .
5,064,423 11/1991 Lorenz et al. .
5,117,799 6/1992 Suzuki et al. .
5,133,188 7/1992 Okada .
5,211,148 5/1993 Furuya et al. .
5,235,956 8/1993 Yoshizaki .
5,299,547 4/1994 Michimasa .

FOREIGN PATENT DOCUMENTS 62-17321 1/1987 Japan .................... 60/611

*Primary Examiner*—Michael Koczo
*Attorney, Agent, or Firm*—Laubscher & Laubscher

[57] ABSTRACT

A turbocharged engine air supply system for eliminating turbo lag in an internal combustion engine includes an air tank containing a pressurized auxiliary air supply which is used to raise manifold pressure promptly during periods of turbo lag, an air pump connected with the engine crankshaft for filling the air tank with compressed air during deceleration and during other periods of operation when it is not necessary to devote all of the engine torque to the driveline, a first valve for controlling the flow of auxiliary air from the air tank to the engine, and a second valve for recirculating turbocharged air when auxiliary air is being supplied to the engine, thereby allowing the turbocharger to accelerate more quickly.

10 Claims, 4 Drawing Sheets

TO CONTROL SOLENOID
14 16 22 8 10 12 18 30 32 34 36 34' 36' 28 20 24 26 4 2 6 64 V REG 62 54 92 V 100 66 80 82 84 70 88 96 98 94 68 86 78 76 72 74 90 V T

TO CONTROL SOLENOID
V REG
V T
V 22
30
32
38
40
34
36
28
20

22
30
32
38
40
34
36
20
28

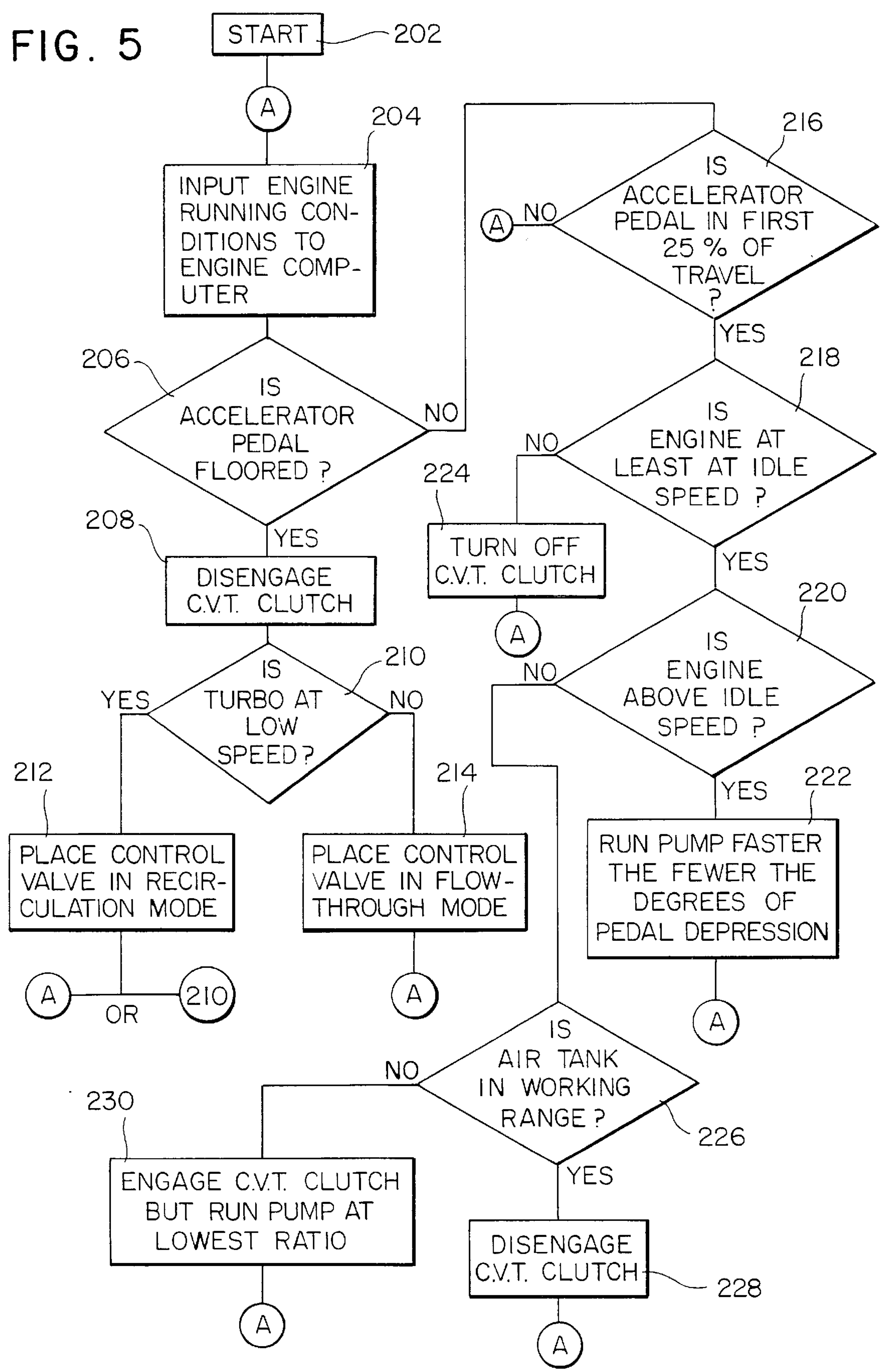
FIG. 5
START
202
A
204
INPUT ENGINE RUNNING CONDITIONS TO ENGINE COMPUTER
206
IS ACCELERATOR PEDAL FLOORED ?
NO
YES
208
DISENGAGE C.V.T. CLUTCH
210
IS TURBO AT LOW SPEED?
YES
NO
212
PLACE CONTROL VALVE IN RECIRCULATION MODE
214
PLACE CONTROL VALVE IN FLOW-THROUGH MODE
A
OR
210
A
216
IS ACCELERATOR PEDAL IN FIRST 25 % OF TRAVEL ?
A
NO
YES
218
IS ENGINE AT LEAST AT IDLE SPEED ?
NO
224
TURN OFF C.V.T. CLUTCH
A
YES
220
IS ENGINE ABOVE IDLE SPEED ?
NO
YES
222
RUN PUMP FASTER THE FEWER THE DEGREES OF PEDAL DEPRESSION
A
IS AIR TANK IN WORKING RANGE ?
226
NO
230
ENGAGE C.V.T. CLUTCH BUT RUN PUMP AT LOWEST RATIO
A
YES
DISENGAGE C.V.T. CLUTCH
228
A

TURBOCHARGED ENGINE SYSTEM WITH RECIRCULATION AND SUPPLEMENTAL AIR SUPPLY

BACKGROUND OF THE INVENTION

The present invention relates to turbocharged engines and, more particularly, to an auxiliary air supply and recirculation system for a turbocharged engine which reduces turbo lag.

A turbocharger increases the horsepower of an internal combustion engine by using otherwise wasted exhaust gas energy to pack more air into the engine, thereby allowing more fuel to be burned. Thus, the overall size of an engine for a given horsepower can be reduced.

Ordinary turbochargers, however, suffer from "turbo lag" which is a delay between the time the vehicle operator depresses the accelerator pedal, thereby increasing the supply of fuel to the engine, and the time the increased exhaust energy takes to speed up the turbocharger. Turbo lag can be reduced by reducing the size of the turbine housing but this compromises the ultimate output of the engine because it reduces the amount of exhaust that can get through the housing at high RPM and therefore limits the energy that can be used to drive the compressor. A wastegate, which releases exhaust pressure, can be used to minimize this problem, as can certain other advances in turbocharger design. However, these advances could be aided by a secondary system which would provide increased manifold pressure at the onset of acceleration or a load change, particularly at low engine speed.

BRIEF DESCRIPTION OF THE PRIOR ART

Various devices for increasing the performance of turbocharged engines are known in the patented prior art. The Weick et al U.S. Pat. No. 3,673,796, for example, discloses an air injection system for turbocharged engines wherein air is released from a tank and injected into the engine manifold in response to a signal representing a change in the magnitude of the load driven by the engine. The system includes a sensor for detecting load variations before engine speed changes occur, a source of pressurized air including an air tank and an air pump connected with the engine intake manifold, a control valve located between the source of pressurized air and its connection with the intake manifold, a pressure actuated flapper valve connected between the intake manifold and the engine turbocharger, and a switching circuit coupled to the sensor and the control valve.

The Lorenz et al U.S. Pat. No. 5,064,423 discloses an auxiliary combustion air supply arrangement for an internal combustion engine including a combustion air supercharger driven by an exhaust turbine. The auxiliary combustion air is supplied by a compressed air tank which supplies air to the intake manifold via an appropriate control mechanism. The system includes an air pump driven by the engine which serves to fill the compressed air tank.

Neither the Weick et al nor the Lorenz et al patents, however, discloses a supplemental air system for a turbocharged engine which recirculates the turbocharged air during injection of the supplemental air. Nor do these patents disclose means for charging a compressed air tank during deceleration.

The Lashbrook U.S. Pat. No. 4,817,387 discloses a turbocharger or supercharger for an internal combustion engine which includes a recirculation loop connecting the compressor output with its input and a recirculation control valve disposed in the recirculation loop for controlling the amount of air flow in the recirculation loop. The recirculation control valve is linked to the engine power control linkage such that at high power, recirculation is blocked while at low power recirculation is unrestricted. As a result, at low power the turbine and compressor are kept running at relatively high RPM due to the recirculation loop being open, and at suddenly increased power demand, power boost is available due to the closing of the recirculation loop. The system does not include a supplemental air supply and does not eliminate turbo lag.

The present invention was developed to overcome these and other drawbacks of the prior devices by providing an improved turbocharging system for an internal combustion engine which includes an air tank containing a pressurized auxiliary air supply which is used to raise manifold pressure promptly during periods typically characterized by turbo lag, an air pump connected with the engine crankshaft for filling the air tank with compressed air during deceleration and during others periods of operation when it is not necessary to devote all of the engine torque to the driveline, a valve for controlling the flow of auxiliary air from the tank to the engine, and a valve for recirculating turbocharged air when auxiliary air is being supplied to the engine, thereby allowing the turbocharger to accelerate more quickly.

Optimally, the air pump used to refill the compressed air tank is run selectively based on the need to keep the tank air pressure within an operating range wide enough so that the pump runs only during deceleration to aid in braking and does not need to run at any other time to keep the tank filled to its maximum pressure. The compressed air tank is filled to its maximum safe pressure during deceleration and any additional air compressed by the pump is exhausted to the atmosphere across a heat exchanger such as the radiator. In this manner, the braking force of the pump can always be relied on. If the tank pressure drops below a minimum operating pressure it is filled by the pump as long as full driveline torque is not needed. Ideally, the working range of the tank is broad enough that this situation never occurs. That is, the tank will be completely filled during deceleration, whereby its replenishment aids in braking and the tank pressure will not drop below the minimum pressure during the next acceleration. If this cannot be achieved, the tank can be refilled during cruising or idling.

SUMMARY OF THE INVENTION

Accordingly, a primary object of the present invention is to provide a combined turbocharger recirculation/supplemental air supply system for an internal combustion engine. It is a more specific object of the invention to provide such a system having an air tank containing pressurized air, an air pump connected with the engine crankshaft for intermittently filling the air tank with compressed air, a valve for controlling the flow of supplemental air from the tank to the engine, and a valve for recirculating turbocharged air when supplemental air is being supplied to the engine.

It is another object of the invention to provide a supplemental air supply system for a turbocharged engine having a continuously variable transmission (CVT) for filling the tank with compressed air. The CVT may be selectively engaged and disengaged from the engine crankshaft depending on the air pressure in the tank.

It is a further object of the present invention to provide a turbocharged engine system having a valve for directing supplemental air to the engine intake manifold and simultaneously directing turbocharged air back to the turbocharger when there is inadequate intake manifold pressure, such as upon initiation of rapid acceleration.

It is yet a further object of the present invention to provide a method of operating a turbocharged engine system including a supplemental air supply based on the engine operating speed, the degree of engine acceleration, and turbo operating speed. The method includes recirculating the turbocharged air if the turbo is operating below a predetermined speed and injecting supplemental air into the engine when the turbocharged air is being recirculated.

It is another object of the present invention to provide a supplemental air supply system for eliminating turbo lag in any turbocharged engine which does not require any internal modifications to the operating parameters beyond those essential to convert a normally aspirated engine to a turbocharged one.

BRIEF DESCRIPTION OF THE DRAWINGS

Other objects and advantages of the invention will become apparent from a study of the following specification when viewed in light of the accompanying drawings, in which:

FIG. 5 is a flowchart of the turbocharging system operation.

DETAILED DESCRIPTION

Figure 1:
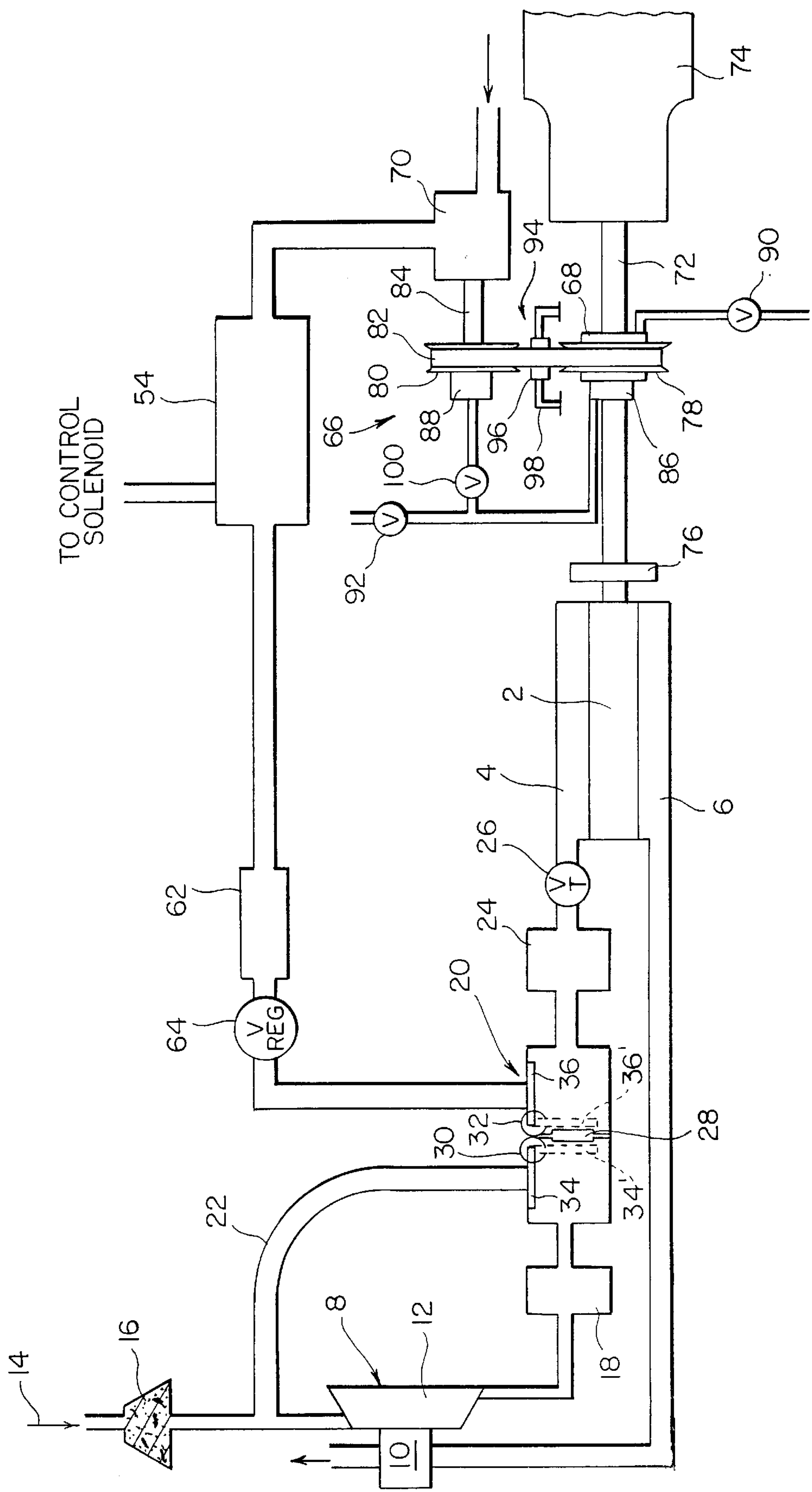
FIG. 1 is a schematic diagram of the turbocharged engine system according to the invention.

Referring first to FIG. 1, there is shown an engine system including an internal combustion engine 2 having an intake manifold 4 and an exhaust manifold 6, and an exhaust driven turbocharger 8 having a turbine section 10 and a compressor section 12. Air 14 enters the system through an air filter 16, passes through the turbo compressor 12 and an intercooler 18, and enters a control valve 20 which determines the destination of the air from the turbocharger.

Turbocharged air entering the control valve 20 is either recirculated back to the inlet of the turbo compressor 12 through recirculation conduit 22 or is directed to a fuel injection system 24 and throttle valve 26 to the engine intake manifold 4 as will be described in greater detail below. Control valve 20 includes a tube 28 located in the center of the valve and a pair of gears 30, 32 having flaps 34, 36 connected thereto, respectively. Flaps 34 and 36 are coated with an elastomeric material which presses against the tube 28 to form a leak-proof seal.

Figure 2:
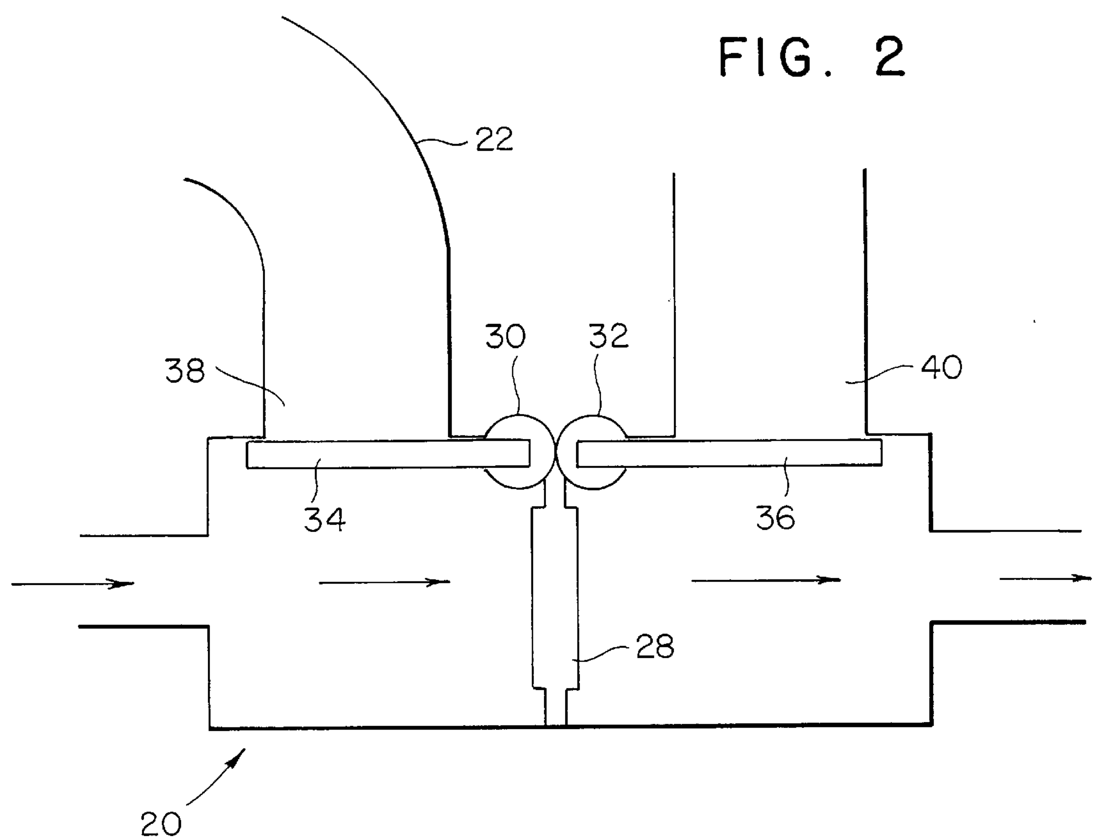
FIG. 2 is an exploded schematic diagram showing the control valve in the open or straight-through position.

Control valve 20 is normally positioned as shown in FIG. 2 which is referred to as the open or straight-through mode. In the straight-through mode, flaps 34 and 36 cover openings 38 and 40, respectively, so that air from the intercooler 18 flows directly through the control valve 20, through fuel injection system 24 and throttle valve 26, and into the engine intake manifold 4 as shown in FIG. 1.

Figure 3:
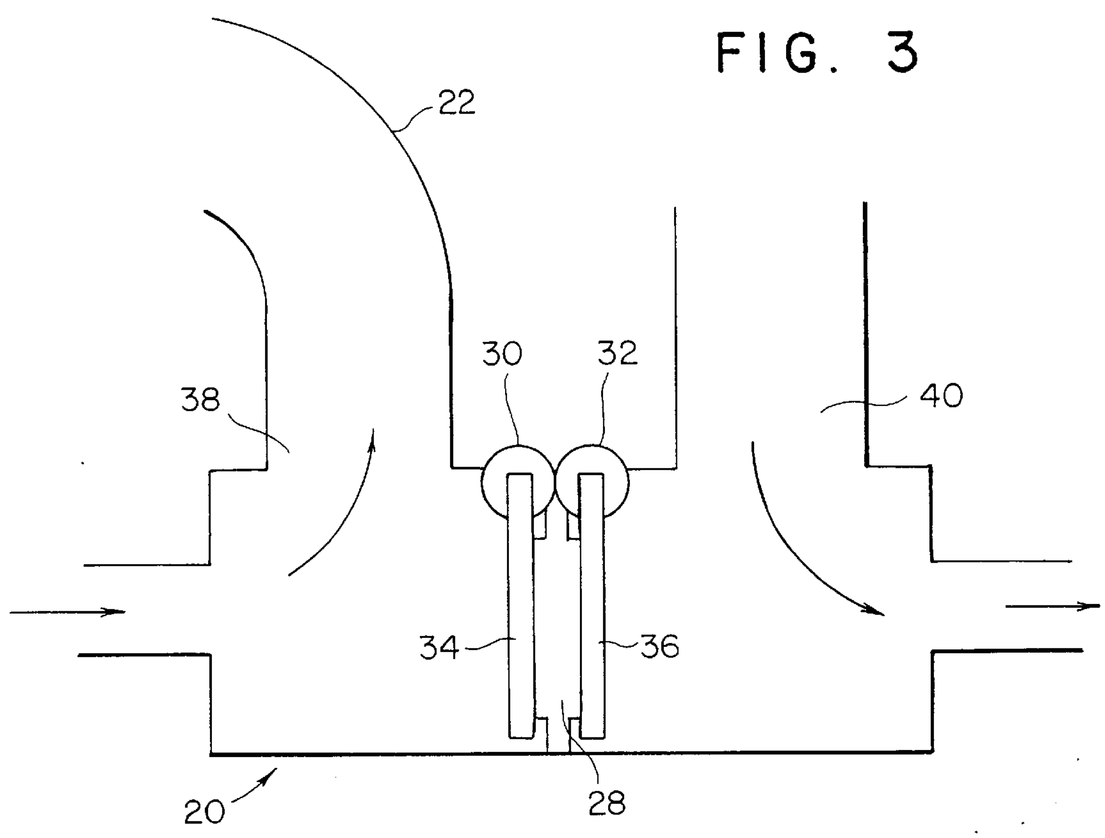
FIG. 3 is an exploded schematic diagram showing the control valve in the closed or recirculation position.

During periods characterized by turbo lag, such as when the vehicle operator fully depresses or "floors" the accelerator pedal, control valve 20 is positioned as shown in FIG. 3. In this position, referred to as the closed or recirculation mode, air entering the control valve from the intercooler 18 is directed through conduit 22, whereby it is recirculated back to the inlet of the turbo compressor 12. This is accomplished by lowering flaps 34 and 36 until they abut tube 28, thereby sealing off the intake manifold so that none of the injected air can escape. The recirculation conduit 22 must be sized so that sufficient pressure is generated during recirculation to trip a pressure switch 42 shown in FIG. 4. Alternatively, a sensor having the ability to measure turbo speed such as a strobe, a laser, a microphone which detects pitch, or another pressure switch which is triggered by actual flow from the tip of the compressor 12 instead of pressure generated downstream by the compressor could be used instead of pressure switch 42. The selection of a conventional pressure switch is based on availability and cost. Such a switch performs generally satisfactorily but may reduce the efficiency of the system because of the restriction in recirculation tube 22. The control valve 20 may be replaced with, for example, a slide or butterfly valve, or by hydraulically or pneumatically driven actuators.

Figure 4:
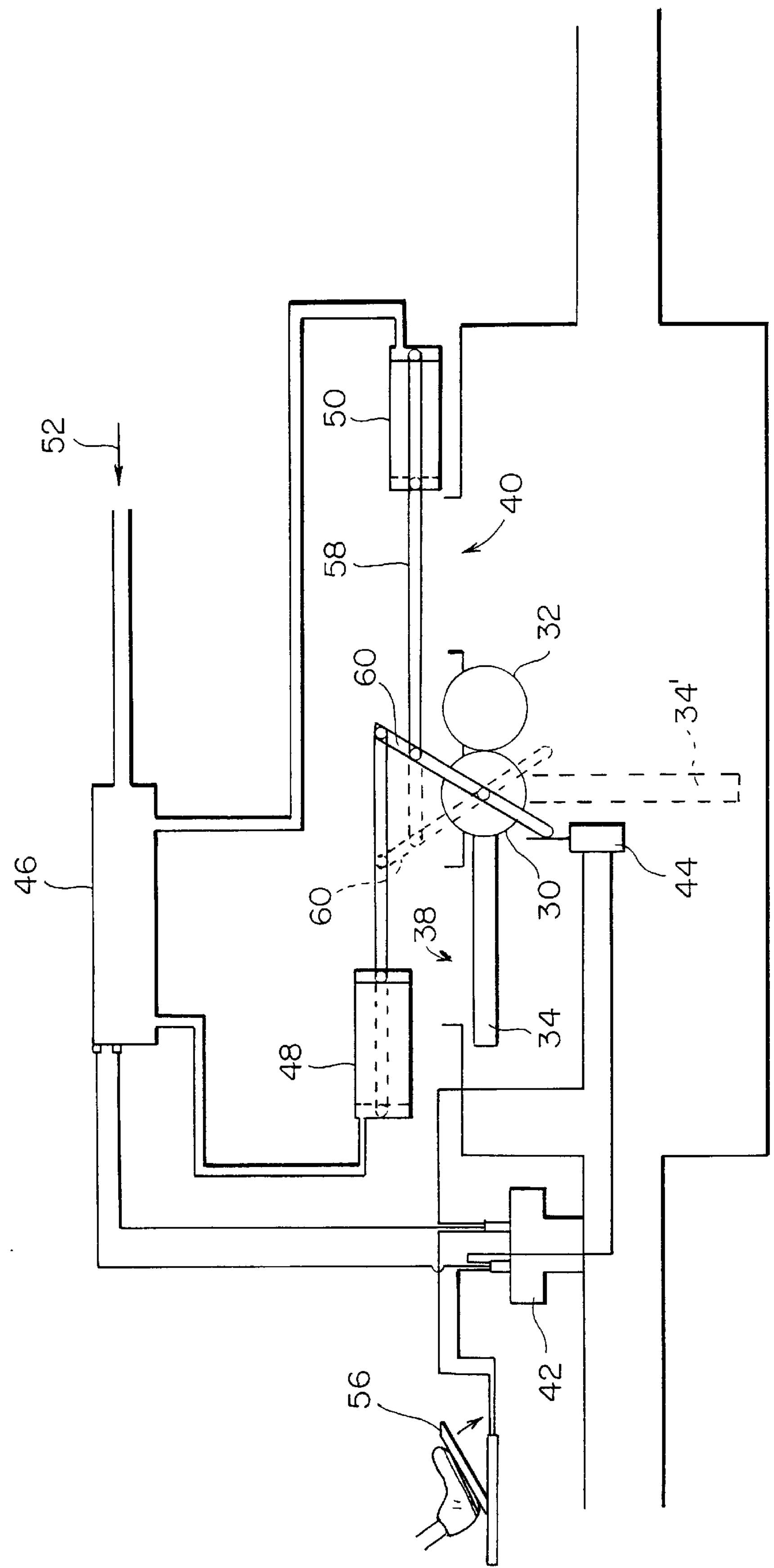
FIG. 4 is a schematic diagram showing the switch and actuators for controlling the position of the control valve.

FIG. 4 shows a control system for valve 20. The system includes a contact switch 44 and a diaphragm control solenoid 46 which controls the position of a pair of actuator diaphragms 48 and 50. The diaphragm control solenoid is actuated by pressurized air 52 from a compressed air tank 54 (FIG. 1). The diaphragm control solenoid 46, contact switch 44, and an accelerator pedal 56 are connected with air pressure switch 42.

When accelerator pedal contact switch 56 is triggered, it closes a circuit which energizes the diaphragm control solenoid 46, thereby releasing the pressure in actuator diaphragm 48, which normally maintains control valve 20 in the straight-through position, and pressurizes actuator diaphragm 50. As diaphragm 50 is pressurized, arm 58 is displaced, thereby rotating arm 60 and the associated gear 30 90° to the position indicated in phantom. Consequently, flap 34 which is connected with gear 30, is rotated to the position indicated in phantom. For clarity, only flap 34 is shown in FIG. 4 but it will be understood that the position of flap 36 is controlled in a similar manner.

A second solenoid valve 62 (FIG. 1), also powered by air from the air tank 54, is simultaneously opened with air from the air tank as arm 60 rotates and closes switch 44 (FIG. 4). Accordingly, as control valve 20 is actuated from the straight-through to the recirculation mode, air from the air tank 54 flows through solenoid 62, through a pressure regulating valve 64, through control valve 20, into the fuel injection system 24, through throttle valve 26, and into the intake manifold 4 of the engine. Alternatively, it will be recognized that the throttle valve 26 may be placed before the fuel injection system 24. The pressure regulating valve 64 is set to deliver air which raises the manifold pressure almost to its maximum. This provides immediate acceleration, and also provides high exhaust pressure to turbine 10 which allows the turbine to reach its operating speed more quickly.

When pressure switch 42 senses that the turbo has reached a high enough speed to produce the necessary boost, it opens, thereby breaking the circuit which has kept the diaphragm control solenoid 46 energized. The diaphragm control solenoid then returns the control valve back to its straight-through position by pressurizing actuator diaphragm 48 and releasing the pressure on actuator diaphragm 50. In addition, as arm 60 rotates counterclockwise, switch 44 is opened, thereby closing solenoid valve 62 and stopping the supplemental injection of air from the air tank 54.

The vehicle, having repeated this process in as many gears as necessary, eventually needs to decelerate. As the driver's foot comes off the accelerator beyond a neutral point, a continuous variable transmission (CVT) 66, which includes a clutch 68, is engaged, thereby running an air pump 70 which supplies air tank 54 with pressurized air. The engine is at the neutral point when further release of the accelerator pedal does not decrease fuel supplied to the engine. Some engines always have a little fuel added to lubricate and cool the cylinders. The throttle valve is completely closed at this point in a gasoline engine. If the driver releases the accelerator pedal further from the full throttle position to, for example, the first 25% of pedal travel, the clutch 68 is engaged and air pump 70 runs. During the transition from 25% to no pedal travel, pump 70 is sped up relative to engine speed by the CVT 66. Thus, the closer the accelerator pedal gets to being completely released, the more braking there is.

A crankshaft 72 connects the engine 2 with a drive train transmission 74 and carries a flywheel 76 thereon. The CVT 66 includes a clutch 68 which is adapted to engage the crankshaft 72, and further includes a first pulley 78 connected with the clutch 68, and a second pulley 80 connected with the first pulley via belt 82. It will be recognized, of course, that the CVT may engage another part of the vehicle driveline. Trucks typically have a power take-off (PTO) for driving the pump which fills the tanks used for air brakes. On vehicles which do not have power take-offs, a concession would have to be made in order to run this pump. Ideally, both pulleys have movable elements so an extensible belt is not necessary. As one pulley closes, thus increasing its usable diameter because it squeezes the belt outward, the other pulley opens wider, thus decreasing its diameter and keeping a constant total theoretical belt length.

Air pump 70 is connected with pulley 80 via shaft 84. Pulleys 78, 80 are moved by a pair of hydraulically or pneumatically controlled servos 86, 88, respectively, and are returned by springs (not shown). When no fluid is against the servos 86, 88 the clutch 68 is disengaged and pulley 80 has a large diameter, that is, the side elements which comprise the pulley are close together. This is the case when the accelerator is depressed beyond 25%. As the accelerator is released to the 25% point in its travel, the clutch is engaged by fluid flowing through valve 90, which is connected with the accelerator pedal, and air pump 70 is driven at a low gear ratio. This engagement could also be performed electromechanically. As the accelerator pedal is released further, valve 92 is opened wider and fluid flows to the valve at a higher rate. This widens the pump pulley 80, thereby decreasing its diameter, and narrows the crankshaft pulley diameter 78, thereby increasing its diameter.

A belt tensioner 94 including an idler wheel pulley 96 attached to a spring loaded arm 98 is used to regulate the tension of belt 82. A valve 100 located in the fluid line to the air pump shaft pulley 80 varies flow if the idler wheel arm 98 moves too much. If the arm 98 moves inwardly towards a theoretical straight line between the centers of the two pulleys, valve 100 restricts flow to the air pump shaft pulley 80, thereby allowing the associated return spring to keep the diameter of the pulley narrow and the belt tight. Another valve (not shown) cuts fluid supply to the CVT when the idle governor senses a low RPM. This changes the CVT to a low ratio so the air pump 70 does not stall the engine. When the air tank 54 is full and the engine is idling, the clutch 68 is disengaged by a signal from a pressure sensor (not shown) connected with the air tank. The fluid used to run the pulley servos could be from many available systems, such as the engine oil, power steering fluid, or another hydraulic fluid, or air.

Alternatively, air pump 70 could be powered by a system including an extensible belt and only one movable pulley, or by a microswitch connected with the vehicle brake pedal which causes the clutch to engage, thereby driving the air pump. In this way, the CVT is eliminated entirely.

Concessions must be made for recharging the air tank 54 if the system is installed on a manual transmission vehicle and the driver does not typically downshift for engine braking. This could be done by having the idle governor run the engine faster when tank pressure is low and, assuming the system is computer controlled, increasing the ratio of the CVT so that the pump runs faster. If the system is installed on a vehicle with an automatic transmission, the CVT 66 must be integrated so that when the transmission downshifts, the CVT goes to its lowest ratio when the downshift is made. This has already been compensated for on a manual transmission as will be made clear from the flowchart of FIG. 5. This is especially true if the driver double clutches and presses the accelerator between gears.

The flowchart in FIG. 5 represents how the present invention could be controlled by a computer. Modern turbocharged engines often have a computer which regulates boost using sensors to determine the onset of detonation, manifold pressure, throttle opening, and various other factors such as timing of fuel injection and spark. The engine computer can be linked to the computer which controls an automatic drive transmission and might retard timing to make a shift smoother. It is clear that these computers could be enlarged or linked to a third computer to more effectively manage the lag elimination system of the present invention. It will be recognized, however, that the system can be operated completely by mechanical relays.

The engine is started at step 202, and at step 204 all engine operating parameters including air tank pressure, turbo speed, pressure on the control valve, position of the control valve, degree of accelerator depression, wastegate position, and manifold pressure are input to the computer. Step 206 determines whether the accelerator pedal is floored, that is, whether the accelerator pedal is depressed far enough for the turbo to generate sufficient boost given enough time and engine speed. If the answer at step 206 is yes, then at step 208 the CVT clutch 68 is disengaged so that all engine output is devoted to driveline. Step 210 determines whether the turbo speed is low. If the answer is yes, then at step 212 the control valve 20 is placed in its recirculation mode and supplemental air from tank 54 is supplied to the engine to increase the intake manifold pressure. If the turbine speed is high at step 210 or if there is sufficient pressure between the turbo and the control valve, the answer at step 210 is no and at step 214 the control valve is placed in the straight-through mode.

If at step 206 the accelerator pedal is not depressed to the point where the turbo ever generates full boost, then step 216 determines if the accelerator pedal is in its first 25% of travel. If the answer to step 216 is yes, then in step 218 the engine RPM is checked to make sure it is at least as high as the desired idle speed to ensure that the pump does not kill the engine. If the answer is yes, the program advances to step 220. Step 220 determines whether the engine is above idle speed. In step 222, braking might be needed or the pump may need to be run in order to fill the tank if the tank is not within the useful pressure range. If the answer is yes, then at step 222 the pump will run faster the fewer the degrees of pedal depression. That is, as the vehicle operator releases the accelerator, the pump runs faster the closer the pedal is to being fully released. For example, suppose that 25% of pedal travel is the neutral point, as previously discussed, and that below this point the engine receives only its minimum cooling fuel. At this point, the dynamic braking of the pump begins so that the more the pedal is released, the more braking force is generated because of the increased speed of the pump.

If the answer at step 220 is no, then step 226 determines whether the air tank pressure is within working range. If the air tank pressure is within working range, then at step 228, the CVT clutch is disengaged and the pump turns off. If the air tank pressure is not within working pressure, the CVT clutch is engaged so that the CVT is run at its lowest ratio and the pump is run at its lowest speed relative the engine speed.

If the engine is not running at least at idle speed at step 218, then at step 224 the CVT clutch is disengaged. Finally, if the answer at step 216 is no, both the CVT clutch for pressurizing the air tank and the control valve system for recirculating the turbocharged air and injecting supplemental air are turned off.

All of the functions described above can be computer determined whereby the driver's only participation is the control of the acceleration pedal.

The present invention must also include an RPM sensor which will prevent the system from being activated if the engine speed falls below a point where, even with the addition of high manifold pressure from the tank, there would not be enough exhaust pressure to spin the turbine 10. On a diesel engine it is useful to have an override on the RPM sensor so that tank air is injected during low temperature starts to increase combustion chamber pressure and, therefore, temperature.

While in accordance with the provisions of the Patent Statutes the preferred forms and embodiments of the invention have been illustrated and described, it will be apparent to those of ordinary skill in the art that various changes and modifications may be made without deviating from the inventive concepts set forth above.

What is claimed is:

1. A system for providing auxiliary air flow to an internal combustion engine having a turbocharger during periods of turbo lag, comprising (a) an air tank containing an auxiliary air supply;

(b) pump means connected with the engine for pressurizing said auxiliary air supply;

(c) valve means connected with said air tank for controlling the flow of auxiliary air from said air tank to the engine; and (d) means connected with the turbocharger for recirculating turbocharged air discharged by the turbocharger back to the turbocharger when auxiliary air is supplied to the engine, thereby reducing the time required for the turbocharger to accelerate to a predetermined operating speed.

2. A system as defined in claim 1, and further comprising transmission means connected with the engine for operating said pump means.

3. A system as defined claim 2, wherein said transmission means comprises a continuously variable transmission.

4. A system as defined in claim 3, wherein said continuously variable transmission is disengaged during acceleration.

5. A system as defined in claim 4, wherein said valve means includes a valve having a normal straight-through position wherein no turbocharged air is recirculated and no auxiliary air is supplied to the engine.

6. A system for providing auxiliary air flow to an internal combustion engine having a turbocharger during periods of turbo lag based on the turbocharger operating speed and the position of the vehicle accelerator pedal, comprising (a) means for determining the accelerator pedal position;

(b) means connected with the turbocharger for determining the turbocharger operating speed;

(c) means connected with the turbocharger for recirculating turbocharged air discharged from the turbocharger if the turbocharger is operating below a predetermined speed and said accelerator pedal position is beyond a predetermined position; and (d) means for injecting auxiliary air into the engine when the turbocharged air is recirculated.

7. A system as defined in claim 6, wherein said injecting means includes a continuously variable transmission, an air pump, an air tank, at least one valve having selectable straight-through and recycle positions, and control means for controlling said valve position.

8. A system as defined in claim 7, and further comprising (1) means for determining the operating speed of the engine;

(2) means for determining the air pressure in said air tank; and (3) means for pressurizing the air in said air tank as a function of the operating speed of the engine and said air tank pressure.

9. A method of operating a supplemental air supply system for a turbocharged engine, comprising the steps of (a) determining the degree of engine acceleration;

(b) determining the turbocharger operating speed;

(c) recirculating the turbocharged air discharged from the turbocharger when the turbocharger is operating below a predetermined speed and the degree of engine acceleration is below a predetermined level; and (d) injecting auxiliary air into the engine while the turbocharged air is being recirculated.

10. A method as defined in claim 9, and further comprising the steps of (1) determining the operating speed of the engine;

(2) determining the air pressure in an air tank; and (3) pressurizing the air tank at a rate as a function of the operating speed of the engine and tank pressure.

* * * * *